April 29, 1958  M. L. ROBERT  2,832,587
SPRING BOOSTER ASSEMBLIES
Filed June 6, 1955  3 Sheets-Sheet 2

INVENTOR.
Maurice L. Robert.
BY
Fearman † Fearman.
ATTORNEYS

April 29, 1958 M. L. ROBERT 2,832,587
SPRING BOOSTER ASSEMBLIES
Filed June 6, 1955 3 Sheets-Sheet 3

INVENTOR.
Maurice L. Robert.
BY
Fearman & Fearman.
ATTORNEYS

United States Patent Office 2,832,587
Patented Apr. 29, 1958

2,832,587

SPRING BOOSTER ASSEMBLIES

Maurice L. Robert, Lansing, Mich., assignor to Universal Air Lift Inc., Lansing, Mich.

Application June 6, 1955, Serial No. 513,370

7 Claims. (Cl. 267—33)

This invention relates to spring booster assemblies and more particularly relates to a spring booster assembly for motor vehicles.

Coil or helical springs are commonly used in the front wheel suspension systems of modern passenger cars and trucks. Because they carry a constant load, viz: the normal weight of the vehicle, the stressing of the metal springs over a period of time, even with loads well under the elastic limit, will cause the spring metal to slowly and perceptively yield. This "set" or "sag," as the yielding is known, is a function of the load or loads carried and of the length of time of application of the load, and obviously decreases the roadability of the vehicle. The amount of sag is, of course, increased by overloading and virtually all vehicle owners overload their vehicles occasionally and some do so frequently. If the overloading is fairly constant over a period of time, the elastic limit of the spring metal will be passed and failure through spring breakage will occur at some local point in the spring such as at a scratch or notch inadvertently made in the spring by a workman's tool or the like. Even where there are no notches or scratches in the springs, frequently springs have weak spots caused by localized fatigues or crystallizations not noted in inspections, and accordingly in the interests of safety it is desirable to provide booster means for supporting the coil springs. Recognizing that it was desirable to individually support some of the convolutions of the spring, a predecessor of applicant's assignee developed the spring booster which is the subject matter of co-pending application Serial No. 214,862 filed by Linley C. Pemberton on March 10, 1951, now Patent No. 2,710,184. This booster was designed to provide an individual yieldable section or node under each convolution. The instant application is directed to a booster which provides an increased supporting area in engagement with the individually supported convolutions of the spring. Further, the instant invention can be employed in vehicles and the like wherein shock absorbers are positioned within the coil springs and the pneumatic booster of the previously mentioned parent application could not be employed.

Broadly, the invention comprises an inflatable, elongated, helical tube formed so that it will be securely retained between the walls of the spring convolutions upon inflation.

One of the prime objects of the invention is to provide a helical spring booster assembly which can be employed whether or not a shock absorber or the like is disposed within the spring.

A further object of the invention is to provide a booster assembly of the type described wherein the supporting force exerted upon the convolutions can be readily varied in accordance with the condition or sag of the springs.

Another object of the invention is to design a booster which does not materially restrict the desired or normal resiliency of any of the convolutions of the springs, but effectively dampens or retards sudden and extreme convolution depressions or compressions incident to the absorption of heavy road shocks.

A further object of the invention is to provide a compound spring suspension device which can be very quickly and conveniently installed in the various spring suspension systems of modern motor vehicles without the use of any tools whatever.

Another object of the invention is to design pneumatic booster means for the springs of a spring suspension system which permits loading beyond the maximum load limit without damage to the system, restores springs which have sagged, and permits the balancing of uneven overloads.

A further object of the invention is to provide a weather and corrosives resistant booster which can be very economically manufactured and sold at prices all income brackets can afford to pay.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 4 is a fragmentary perspective view of one end of the helical booster tube only.

Figure 1:
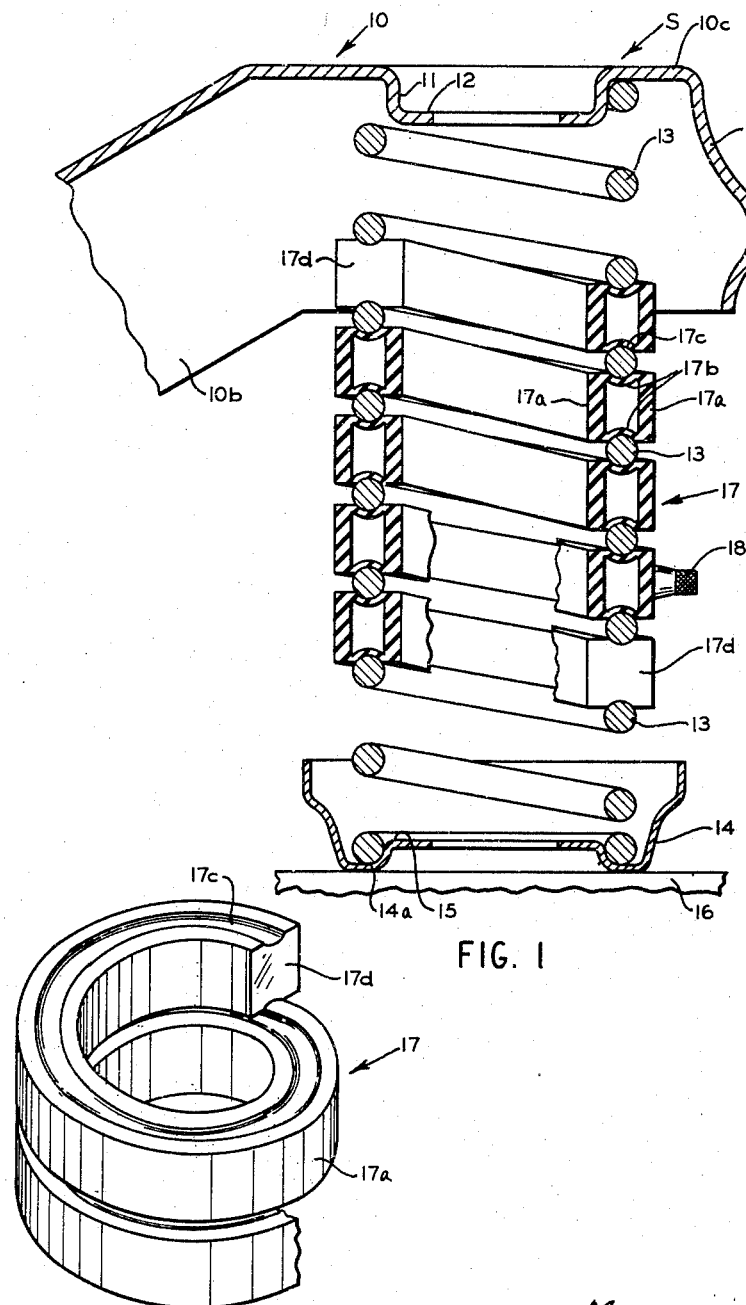
Fig. 1 is a fragmentary, vertical, cross sectional view illustrating the construction of the air filled resilient booster unit which is positioned between the convolutions of a coil spring in a vehicle front end suspension system supporting the weight of a vehicle which is assumed to be at rest.

Referring now more particularly to the accompanying drawings wherein I have shown a preferred embodiment of the invention, a letter S generally indicates a portion of a motor vehicle front end spring suspension of the knee action type. The spring assembly S includes a pressed metal chassis frame bracket 10 which extends transversely of the frame, the ends 10a thereof extending out beyond the chassis side frame members as usual and the central portion 10b providing a cradle for supporting the front end of the vehicle motor. Pressed out of the flange 10c are annular spring supports 11 having inwardly directed flanges 12 and the uppermost convolutions of the front end suspension springs 13 encircle the supports 11 as shown and are retained thereby. The lowermost convolutions of the springs 13 are received within cups 14 which have inwardly and upwardly extending flanges 15 providing annular retainers for the lower ends of the springs. Both the upper and lower ends of the springs are, of course, secured to the members 11 and 14 in the usual manner. The cup members 14 are supported on the knee levers 16 which are pivoted to the portions 10b of bracket 10 as usual. The outer ends of the levers 16 are, of course, pivoted to the steering knuckle bearing brackets. The above knee action type spring suspension system or one similar thereto is employed in most motor vehicles for supporting the front ends thereof and obviously road shocks imparted when the vehicle's front wheels travel over uneven ground will be transmitted to the springs 13 through the knee action lever system. Actually, of course, only one end of the bracket 10 and only one spring 13 is shown, however those acquainted with the art will understand that the opposite end of the spring suspension will be identical.

Figure 2:
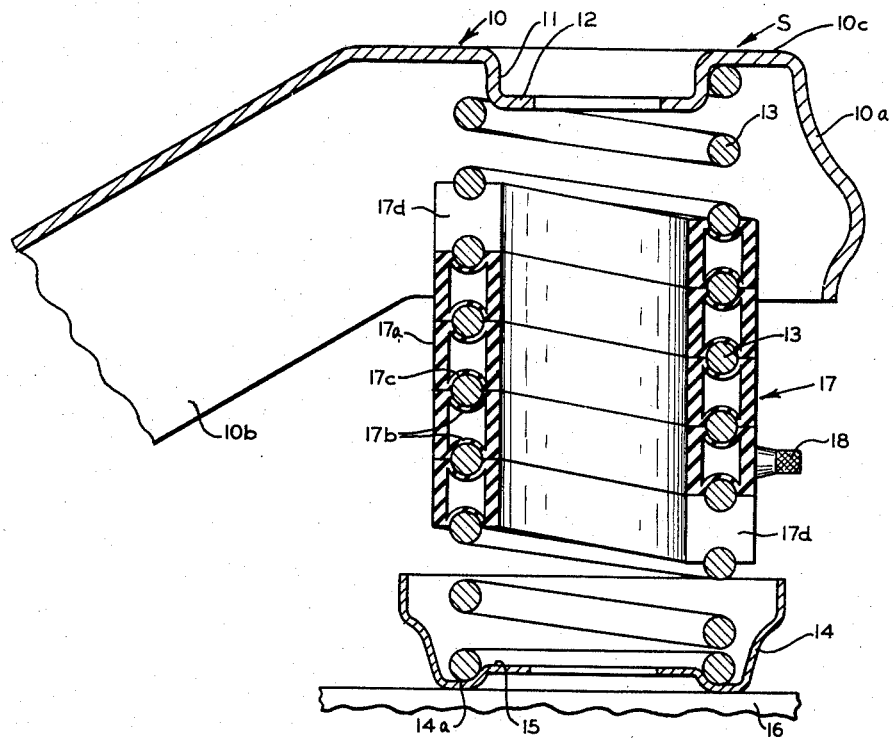
Fig. 2 is a similar view showing the system when a normal road shock has slightly compressed the spring.
Figure 3:
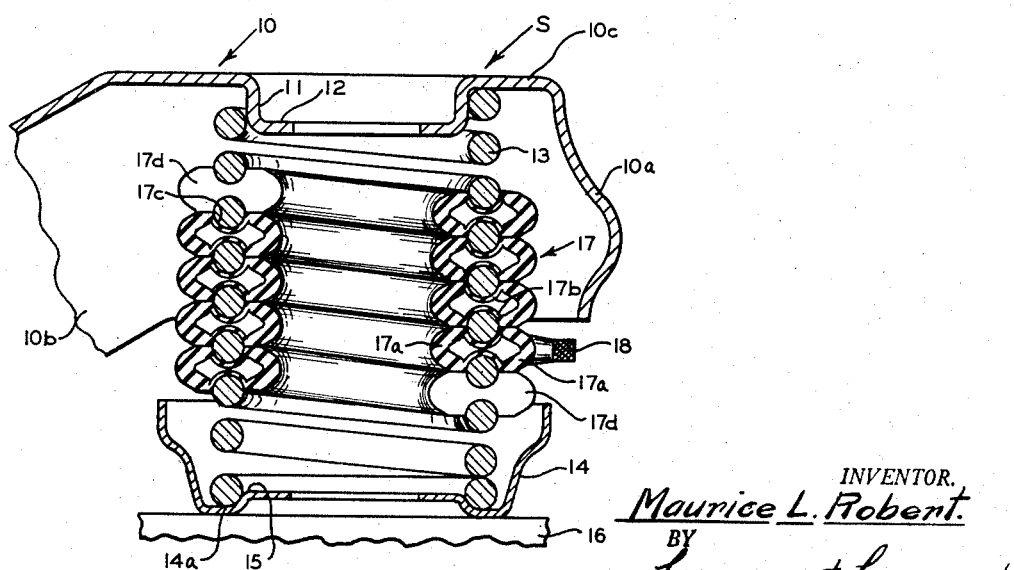
Fig. 3 is another similar view illustrating the manner in which the booster dampens the compression of the spring when an abnormally severe road shock is transmitted to the system.

Mounted between the convolutions of the spring 13 is a resilient, expansible, elastic tube 17 which is molded in coil or helical form of natural rubber or a suitable synthetic rubber like material such as neoprene, butyl, or butadiene which is resistant to moisture, grease, and grit deterioration. The tube 17 is formed in the cross section shown with relatively thick side walls 17a connected by relatively thin curvilinear walls 17b at a spaced distance from the ends of the walls 17a so that convolution receiving pockets 17c are formed. The walls 17b will preferably be approximately one third as thick as the walls 17b in order that the natural or normal action of the spring will not be materially dampened since the walls 17b will necessarily have to possess a considerable degree of elasticity. The ends of the tube 17 are closed by walls 17d of substantially the same thickness as the retaining walls 17a which are sufficiently thick so that the tube cannot be easily pulled from the convolutions when the tube is inflated even slightly. It is important to note that the tube 17 is of a length so that its upper and lower ends terminate prior to coming into engagement with the flange 10a of the bracket 10 and the bottom 14a of the cup 14. Further, the tube 17 is initially molded with a pitch of a degree such that it fits between the convolutions of a spring of given size and in the present embodiment the coils of the tube do not touch one another when the spring is bearing only the weight of the vehicle (Fig. 1). When the spring 13 is compressed by a normal road shock the relatively elastic walls 17b are the ones which are deformed while the relatively heavier walls 17a do not buckle (see Fig. 2). Since normal shocks or bumps do not compress the walls 17a, obviously the tube 17 does not interfere with the roadability of the vehicle and in no manner affects the smoothness of the ride. When abnormal shocks or impacts are transmitted to the spring 13 however, the walls 17a offer considerable resistance to buckling or compression and effectively dampen the spring action (see Fig. 3).

To install the tube 17 is a very simple operation, it being merely necessary after jacking the vehicle to elongate the spring to press the tube 17 in between the convolutions when the vehicle is at rest. If the spring has sagged inflation of the tube with air through the inflating valve 18 which is of the conventional type found on pneumatic tires of all kinds will restore the spring to normal position since the tube 17 was molded with all convolutions having the pitch of a normal spring such as in Figure 1 which has not sagged.

The tube 17 will preferably be inflated until the spring 13 has been extended longitudinally or axially to eliminate its sag and restore it to its former length. In new vehicles whose springs have not had an opportunity to sag the tube will be inflated only sufficiently so that each convolution is buoyed or braced without interfering with or materially dampening its normal action. If the new vehicle is to be overloaded, obviously the degree of inflation will be greater. In any case when the tube is inflated with any suitable compressible medium such as compressed air a compound spring suspension is produced which will greatly enhance the roadability of the vehicle and add appreciably to the smoothness of the ride.

In the afore-mentioned application a modification of the invention was illustrated in which a helical spring assembly was installed at the rear end of the vehicle between a leaf spring and a side channel chassis member. Obviously, if such a spring were supported in position in the manner described the instant booster tube could be applied to the convolutions of the spring.

It should be apparent that I have perfected a compound spring assembly including a helical spring and a pneumatic element wherein the pneumatic element has all possible surface in supporting engagement with the individual convolutions of the spring. The assembly is very practical and unlike solid rubber shims which I understand have been used between the convolutions does not prevent the springs from operating in their normal manner. The walls 17a are sufficiently rigid so that the tube 17 will be retained in position when inflated, however the much more elastic walls 17b permit normal spring action.

Figure 5:
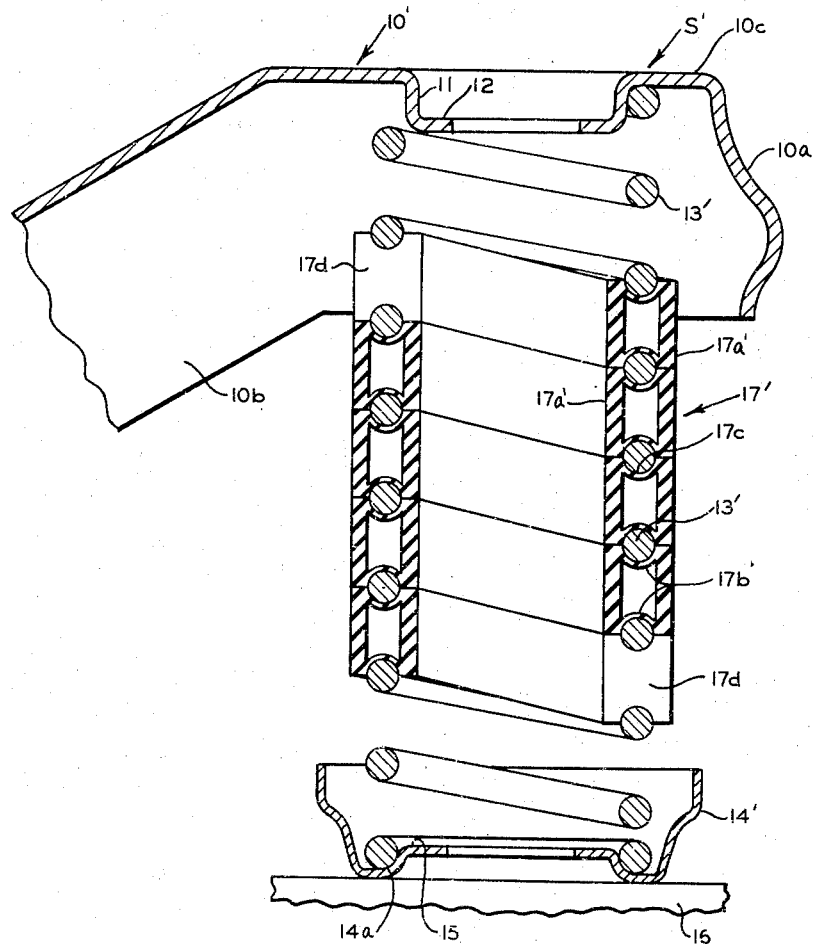
Fig. 5 is a view similar to Fig. 1 showing a modified embodiment of the invention.

In Fig. 5 I have shown another embodiment of the invention in which the tube 17 is of a width such that it completely fills the spaces between the convolutions of the spring 13' when the latter is supporting only the weight of the standing vehicle. This form of the invention is designed particularly for vehicles which travel over very rough, uneven surfaces. When the spring is compressed the walls 17b' first cushion the spring action and thence the side walls 17a' further cushion the shock when the spring is compressed a certain distance as in the first described embodiment. If desired, of course, the tube 17' could be of a length such that the ends thereof are in engagement with the member 10' and cup 14', when the spring is supporting only the weight of the vehicle as in Fig. 5. In this instance the walls 17a would of course, immediately operate to cushion the spring action.

It is to be understood that I contemplate that various changes may be made in the various elements which comprise the invention without departing from the spirit thereof or the scope of the appended claims.

I claim:

1. A spring suspension unit comprising a pair of spaced, relatively movable members, a coil spring interposed between said members for yieldably maintaining said members in spaced relation, an inflatable tube disposed between adjacent convolutions of said spring, the tube having elastic upper and lower walls receiving said convolutions to provide yieldable supports for the same, and means for inflating and deflating said tube.

2. A spring suspension unit adapted to extend between two spaced, relatively movable members so as yieldably to maintain said members in spaced relation, said unit comprising a coil spring, an elongated, spiral-shaped, inflatable tube conforming to the space between adjacent convolutions of said spring received between said convolutions, and valve means communicating with the interior of said tube for permitting inflation of said tube to support the convolutions individually.

3. A spring suspension unit adapted to extend between two spaced, relatively movable members, a coil spring interposed between said members for yieldably maintaining said members in spaced relation, an inflatable, elastic tube comprising side walls connected by upper and lower curvilinear walls of narrowed thickness and increased elasticity with relation to said side walls, said tube being spirally wound between adjacent convolutions with the superposed sections of the upper and lower walls of said tube forming sockets receiving said convolutions, and means for inflating and deflating said tube.

4. A spring suspension unit comprising a pair of spaced, relatively movable members, a coil spring interposed between said members for yieldably maintaining said members in spaced relation, an inflatable tube disposed in spiral form between the adjacent convolutions of said spring, the tube being of such length that its ends do not engage the said relatively movable members, and means for inflating and deflating said tube.

5. A spring booster adapted to be placed between the adjacent convolutions of a coil spring which is fixed between two relatively movable members comprising, an elongated, hollow, spiral-shaped elastic rubber like tube having substantially planar side walls connected by concave upper and lower walls, the edges of said side walls extending beyond said upper and lower walls, and valve means in a side wall permitting inflation of said tube.

6. The construction set forth in claim 5 in which said side walls and said upper and lower walls are of different thicknesses.

7. The construction set forth in claim 6 in which said side walls are thicker than said upper and lower walls.

References Cited in the file of this patent

UNITED STATES PATENTS

| | | |
|---|---|---|
| 1,634,895 | Amory | July 5, 1927 |
| 2,377,170 | Morgan | May 29, 1945 |

FOREIGN PATENTS

| | | |
|---|---|---|
| 569,919 | Great Britain | June 14, 1945 |
| 1,065,808 | France | Jan. 13, 1954 |